(12) United States Patent
Goll

(10) Patent No.: US 8,096,321 B2
(45) Date of Patent: Jan. 17, 2012

(54) REDUNDANT ELECTROHYDRAULIC VALVE SYSTEM

(75) Inventor: Armin Goll, Mulfingen (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 1121 days.

(21) Appl. No.: 11/813,128

(22) PCT Filed: Dec. 14, 2005

(86) PCT No.: PCT/EP2005/013429
§ 371 (c)(1),
(2), (4) Date: Oct. 22, 2007

(87) PCT Pub. No.: WO2006/072377
PCT Pub. Date: Jul. 13, 2006

(65) Prior Publication Data
US 2009/0000672 A1 Jan. 1, 2009

(30) Foreign Application Priority Data
Jan. 7, 2005 (DE) .......................... 10 2005 001 055

(51) Int. Cl.
*F16K 31/06* (2006.01)
(52) U.S. Cl. ................... 137/625.65; 137/601.14
(58) Field of Classification Search ............. 137/596.16, 137/625.64, 599.11, 601.14, 625.65, 596.17; 60/403; 91/6
See application file for complete search history.

(56) References Cited

U.S. PATENT DOCUMENTS

| 4,345,620 | A | * | 8/1982 | Ruchser et al. | ............ 137/596.16 |
| 5,309,944 | A | | 5/1994 | Chikamatsu et al. | |
| 6,374,856 | B1 | | 4/2002 | Nitsche | |
| 6,637,199 | B2 | * | 10/2003 | Spickard | ........................ 60/403 |
| 2003/0140625 | A1 | | 7/2003 | Spickard | |
| 2003/0157875 | A1 | | 8/2003 | Horner et al. | |

FOREIGN PATENT DOCUMENTS

| DE | 197 19 557 | 10/1998 |
| DE | 100 36 286 | 2/2002 |
| EP | 0 366 281 | 5/1990 |

\* cited by examiner

*Primary Examiner* — John Rivell
*Assistant Examiner* — Craig J Price
(74) *Attorney, Agent, or Firm* — Baker & Daniels LLP

(57) ABSTRACT

An electrohydraulic valve assembly having an inflow channel, a working channel and an outflow channel, including first and second valves each having a magnetic regulating device for applying a regulated activation force to the respective valve. The valves are arranged in parallel so that either can provide the hydraulic connection between the inflow, working and outflow channels. In the case of error detection, the active valve is deactivated and the until then passive valve is activated and vice-versa. The deactivating of a valve device moves the valve piston to a hydraulic neutral position by means of a second stage.

21 Claims, 3 Drawing Sheets

REDUNDANT ELECTROHYDRAULIC VALVE SYSTEM

CROSS-REFERENCE TO RELATED APPLICATION

This application is related to and claims the benefit under 35 U.S.C. §119 and 35 U.S.C. §365 of International Application No. PCT/EP2005/013429, filed Dec. 14, 2005.

The invention concerns a redundant electrohydraulic valve assembly, in particular an electrohydraulic valve provided with a magnetic actuating element, as well as especially its use for regulating the stroke position of a low pressure working cylinder.

Electrohydraulic valves having actuating elements operated by magnetic force are known in various embodiments. For example DE 197 19 557 A1 describes a proportional directional valve, in which a magnetic force action is applied to the valve piston. One application of such electrohydraulic valves is the regulation of a volume flow for a working cylinder, and thereby the regulation of the stroke position of the working cylinder, wherein in the following preferably hydraulic systems in the low pressure range are addressed.

Such a working cylinder may in turn serve to operate a valve assigned to a steam turbine. Further typical applications consist in the admission to a valve applied in process technology, for example for a comprimating device. Especially in applications in the context of chemical industry, it is intended to achieve a runtime of a production process, which is not interrupted for years, which results in the necessity of a design of the actuating means of a process valve applied to this end, which is especially safe in application. The requirement of a preferably redundant design of an electrohydraulic valve for controlling the working stroke of a working cylinder also follows from this. In addition, such applications require a design, which makes sure that in case an error occurs, which cannot be intercepted any more, the system is transferred into a reliable state of operation. For example, in case of error, a valve assigned to a steam turbine is closed by means of the working cylinder, so that the subsequent installations are shut down and are not operated in an uncontrolled mode.

It is problematic to simply operate in parallel two electrohydraulic valves which are constructed in the same way though, in that in case one of the valves fails, the hydraulic connection of both valves may lead to occurrence of a hydraulic short-circuit, and a compensation of the malfunction by means of the second valve, which is still operable, therefore becomes impossible. If a malfunction occurs, wherein one valve is completely steered into one of its external positions, an open connection between the inflow channel and the working channel, or the outflow channel and the working channel occurs. The regulation of the still operable second valve will try to compensate the pressure rise or pressure fall in the working channel, respectively, in that it readjusts the second valve in opposition to the defective first valve, Thereby, a hydraulic short circuit occurs either by means of the connection from the inflow channel via the working channel to the outflow channel or from the outflow channel via the working channel to the inflow channel. In order to avoid this difficulty, there may be applied switching valves, for example, In order to separate the inflow channel(s) and the working channel(s) of hydraulic valves which are connected in parallel in case of error. It is the/a disadvantage of such switching valves that in the low pressure range they are large in construction and are prone to error themselves though, which in turn reduces the stability and availability of the assembly, In addition, a higher-ranking control logic would be necessary in order to detect an error occurring at a valve device, and to separate it off by means of the switching valves assigned to it in a hydraulic manner then, Such a higher-ranking control system would be extensive in construction though, and provides another possible source of error, so that in order to increase the structural stability in this case as well, a redundant design would be possible.

The invention is based on the problem to present a redundant electrohydraulic valve assembly, wherein the redundant electrohydraulic valve assembly is to be designed in such a way that a higher-ranking control installation for detecting errors can be omitted, In addition, it should be possible to shut down and subsequently separate off a defective valve device without having to apply additional switching valves for coupling or decoupling, respectively, In this, the until then common transfer of the system Into a secure operational state in case of error shall be maintained, so that a secure operation and a controlled shut-down is possible at any time.

In order to solve the problem according to the invention, it was at first noticed that a higher-ranking control installation for error detection can be omitted, if the redundant electrohydraulic valve assembly consists of valve devices, which are substantially built in the same manner, and which are arranged in parallel. Only one of these valve devices is active during operation, I.e. it takes over the regulating function for the hydraulic medium, while the second valve device, being arranged in parallel, is activated though, but does not fulfill any regulating function, i.e. it is passive.

The passive valve device monitors the operational functions though, especially the control deviation, so that it is able to detect a malfunction of the active valve device. In this case, the passive valve device will shut down the initially active valve device and activate itself. In the following, this operation will be referred to as concurring commutation. On the other hand, it is also possible that the active valve device detects a malfunction itself, for example by means of monitoring nominal values and control deviations with respect to plausibility, and by itself executes a switching to the until then passive valve device and deactivates itself. This is referred to as cooperative commutation.

In order to avoid hydraulic short circuits in case of error, the control devices assigned to a valve device are preferably built in two stages. A first stage serves to create a regulated force application for the control piston of the valve. This will be used in normal operation. This force is created by means of a regulating magnet, to which a force regulation unit is assigned.

A second stage of the actuating element serves to move the valve piston into the hydraulic neutral position in case of error, so that the working channel is neither bypassed by the inflow channel nor by the outflow channel, and in this way, a separation of the defective valve device from the hydraulic circuit is effected. Preferably, this second stage of the actuating element is provided with a magnetic force system itself, wherein this, for reasons of simplification, may be not a regulating, but only a steering/controlling magnet, to which in case of error maximum force is applied, and the control motion of which Is limited by means of a stopper, which is arranged in such a position that the motion of the valve piston created by means of the control magnet stops in the hydraulic neutral position of the valve device. Instead of a magnetic force system for the second stage of the operating control, there can also be used other devices, by means of which it is possible to move the valve piston in(to) the hydraulic neutral position. This can, for example, be a system pre-charged by spring force, which is disconnected in case of error, and runs against a stopper, which is positioned in a suitable way.

In a particularly preferred embodiment, the means for detecting an error correspond each to the first stage of the actuating element, in which the force application to the valve piston during normal operation is regulated as well. In a particularly preferred manner, in order to monitor errors, the control reference values are checked for plausibility. A case of error is especially given if there is no nominal value present. Such a situation can arise in case of a break of cable, for example. Further, there can be implemented additional thresholds for the reference signal, in order to detect impossible prescribed references as an error. It is further preferred to monitor the control deviation, and to initiate a cooperative commutation to the until then passive valve device, if a maximum control deviation is exceeded. A further error condition can be detected by monitoring the propagation of the control deviation in time. Furthermore, it is preferred to conduct a monitoring of the speed of change of the nomimal value and/or an actual value monitoring with respect to extreme values. For a preferred embodiment two-position controllers are used. Therefore, a regulation frequency can be monitored as well.

In a preferred embodiment of a parallel assembly of a first valve device and a second valve device the respective first stages of the actuating elements, which are intended for the regulation, are each respectively connected to the respective second ones, which are provided for leading back to the neutral position. In this manner, an at first passive valve device, which monitors the active valve device, can control the second stage of the actuating element of the active valve device in case of error in such a way, that the regulation of the until then active valve device is shut down and the valve piston of the until then active valve device is moved to the hydraulic neutral position, In this case, the until then active valve device is shut down then, and according to a preferred embodiment, this shut-down operation also initiates the commutation to the until then passive valve device at the same time.

In the following, the invention is described further referring to figures. Therein, the following is shown in detail:

Figure 2:
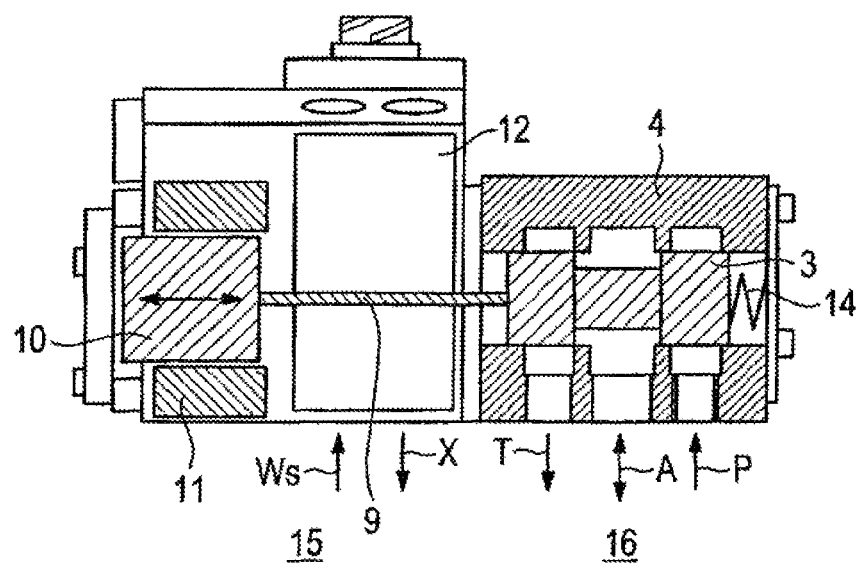
FIG. 2 shows a single valve device having a one stage magnetic force unit and a hydraulic 3/3 valve.
Figure 3:
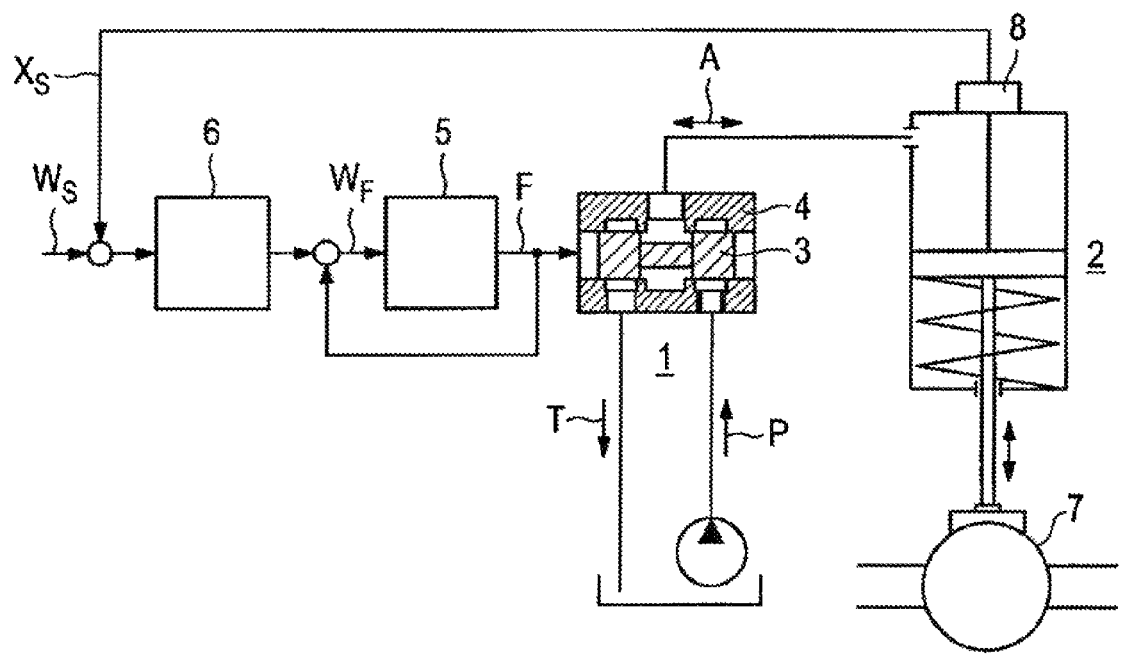
FIG. 3 shows the positional regulation of a working cylinder having an underlaying force regulation for an electrohydraulic directional valve.

In FIG. 3, a typical arrangement of an electrohydraulic valve 1 for regulating the stroke position of a working cylinder 2 is outlined. The hydraulic component of the hydraulic valve 1 in FIGS. 2 and 3 is shown as a 3/3-valve, but other embodiments, for example a 4/3 valve, may be conceived, The hydraulic valve comprises at least one inflow channel P and (at least) one outflow channel T, as well as a working channel A in connection with the working cylinder 2, for example. According to the position of the valve piston 3 in the valve body 4, as well as the chosen location of the control edges of the valve piston and those of the valve housing will be formed a connection channel between the inflow channel P and the working channel A or between the working channel A and the outflow channel T, respectively. By means of the inflow of the hydraulic working medium from the inflow channel P to the working channel A, the pressure in the working cylinder 2 will rise, and due to the embodiment of the hydraulic valve at the front face of the valve piston, which is not shown in detail, a counter pressure builds up to such an extent that the valve piston is lead to the hydraulic center, and that in the so called hydraulic neutral position both, the connection of the inflow channel P to the working channel A, as well as the connection between the working channel A and the outflow channel T are closed.

Therefore, by means of an application of a force to the valve piston in axial direction, a volume stream from or Into the working cylinder can be created, which results in a change of the stroke position of the working cylinder. In that energy collecting elements, which are not shown in detail in FIG. 3, are supplemented to the hydraulic valve, it can be designed as a proportional directional valve. Also, a purely directional valve is conceivable.

In order to apply a regulated axial force to the valve piston 3, a magnetic actuating element 5 is preferably used, to which a nominal value WF for the magnetic force is prescribed, and wherein and a regulating controller is provided, which serves to regulate this reference force.

For example, such valves are known from the prospects
1) RD 29 586/09.89 of Mannesmann Rexroth
2) "Fluidtechnik" ("fluid technology") Nr. 7502263.0503.92 of Herion-Werke K G, In order to regulate the force action of the magnetic actuating element 5 in a particularly preferred manner, the strength of the magnetic flux, for example by means of a hall sensor, is measured, and is converted into a force value, which in turn is fed back to the force feedback loop as a reference value of force then.

In a typical application, the working cylinder 2 by means of an adjustment of its stroke position adjusts the position of a process valve 7. Such process valves are usually used for steam turbines in a machine unit for electric power generation. Often, such turbines are also designated for compressors, for example to be applied in refineries or chemical plants or to be applied in the metallurgical industry.

The reference value prescribed for the stroke position $W_s$ of the working cylinder 2 is adjusted by means of a position regulating unit 6, which accesses the force regulating unit of the magnetic actuating element 5 in the sense of an underlaying regulation, At the input, the control deviation, which Is created from the difference between an externally prescribed positional reference value $W_s$ and the measured actual position value $X_9$ of the working cylinder, is applied to the position regulating unit 6. In order to determine the actual position value $X_s$ of the working cylinder, a path measurement device 8 provided to the working cylinder is preferably used.

FIG. 2 shows an electrohydraulic valve device of the aforementioned kind, comprising a valve body 4 and a valve piston 3, wherein for this 3/3 valve shown here, a connection between an inflow channel P and a working channel A to the one hand, and the working channel A and the outflow channel T to the other, may be created by means of the choice of the location of the control edges of valve piston 3 and valve body 4 and of the axial position of the valve piston 3 in relation to the valve body 4. Further, the valve piston 3 may also be transferred into a hydraulic neutral position, for which there exists no connection of the working channel A with the inflow channel P and the outflow channel T. The embodiment shown in FIG. 2 shows an energy collecting unit 14 in form of a spring, so that the hydraulic valve is designed as a proportional directional valve. For admission of an axially directed force to the valve piston 3, this is at least indirectly operationally connected to a pusher 9 and an anchor 10, which in turn effects an axial force action by means of magnetic field generated by means of a solenoid 11. Further, the regulating magnet 15 of the electrohydraulic valve device comprises a regulating and a controlling electronics, to which the positional reference value Ws, as well as an actual position value X of the working cylinder is supplied to. Internally, for the underlaying feedback loop the reference value for the force progression is then prescribed to the valve piston 3 of the hydraulic component 16.

Figure 1:
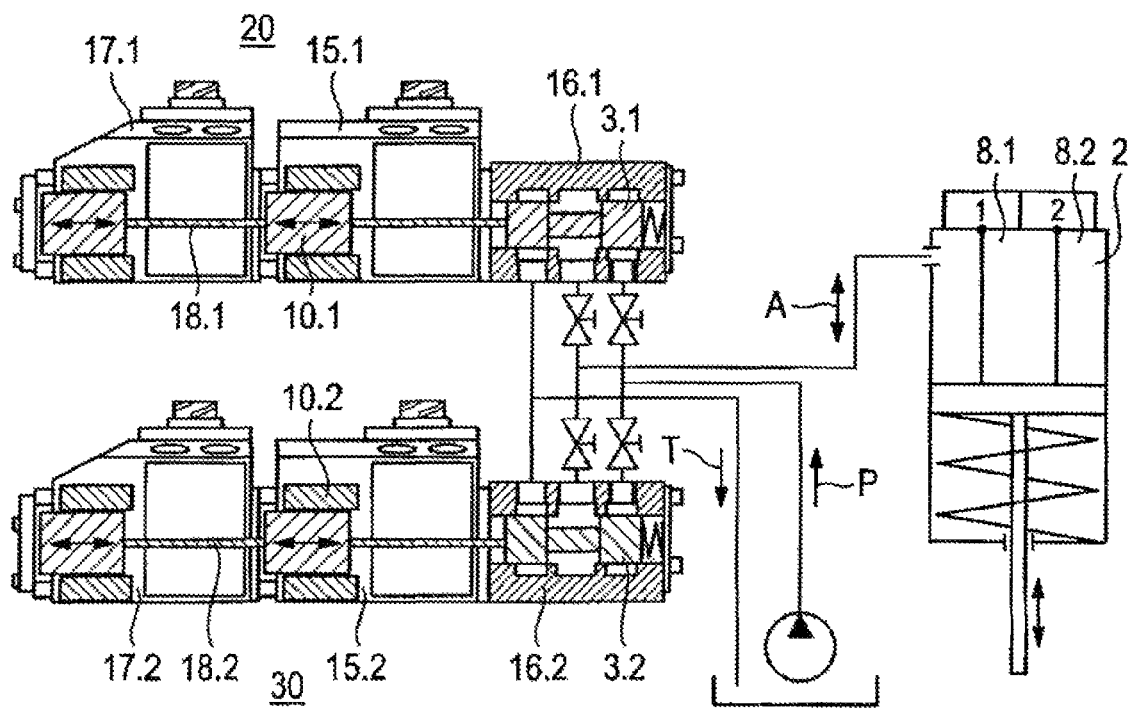
FIG. 1 shows two electrohydraulic valve devices arranged in parallel, according to the invention, wherein this parallel assembly forms a redundant electrohydraulic valve for regulating the stroke position of a working cylinder.

An embodiment of an electrohydraulic valve assembly, which, according to the invention, is redundantly designed, is shown in FIG. 1 in schematically simplified form. As compared to the simple electrohydraulic valve device of FIG. 2, two hydraulic valve devices 16.1 and 16.2 having the first valve piston 3.1 and the second valve piston 3.2 arranged in parallel to each other, i.e. the inflow channels P and the outflow channels T, are in respective hydraulic connection to each other. Further, both, the first hydraulic unit 16.1 as well as the second hydraulic unit 16.2 both access the working channel A connected to the hydraulic cylinder 2. Preferably, in order to sense position, two path measurement devices 8.1 and 8.2, which work independently of each other, are provided at the working cylinder 2. The first path measurement device 8.1 is intended for the first regulating magnet 15.1, and the second path measurement device 8.2 is accordingly intended for the second regulating magnet 15.2. The magnetic unit of the first valve device 20 and that of the second valve device 30 are each realized by means of two independent stages. The respective first stages 15.1 and 15.2 present regulating magnets, i.e. by means of their assistance, it is possible to apply a regulated axial force action onto the valve piston of the respective hydraulic component 16.1 and 16.2. In addition, the first valve device 20 as well as the second valve device 30 in a second stage, are both provided with a control magnet 17.1 or 17.2. The function of these control magnets is to move the respective valve piston into the hydraulic neutral position in case of error, in order to avoid a hydraulic short circuit. In order to realise this function, in the simplest case, the control magnet is connected upstream to the regulating magnet, so that by means of a pusher 18.1, 18.2 it can move the respective anchor 10.1, 10.2 of the regulating magnet 15.1, 15.2, and thereby also the respective valve piston of the assigned hydraulic valve component 16.1, 16.2 into the hydraulic neutral position.

In operation of the electrohydraulic valve, which is designed in parallel, it is either only the first or only the second electrohydraulic valve device which will be active, i.e. only its position regulating means will determine the stroke position of the working cylinder 2. The respective other electrohydraulic valve device, which is passive, will have a shutdown regulation function and a hydraulic component in the neutral position. To this end, the control magnet 17.1, 17.2 of the passive valve device forces the valve piston of the hydraulic component 16.1, 16.2 into the hydraulic neutral position, while the regulating magnet 15.1, 15.2 of the passive valve device is not operating.

The passive valve device remains activated though, i.e. it monitors the regulation's reference value for the stroke position of the working cylinder, as well as the presently applied control deviation and the actual value corresponding to it. If no nominal values or actual values, respectively, exist, or if these are outside certain limits, an error case is assumed. From a certain control deviation onwards, or if a certain speed of change of the control deviation is exceeded, respectively, something similar/related applies. In case of error, the passive and monitoring valve device will transmit a commutation signal to the active valve device. In a preferred embodiment, this signal will be supplied to the control magnet 17.1, 17.2 of the active valve device. This then leads the valve piston 16.1, 16.2 into the hydraulic neutral position and detaches the regulating magnet 15.1, 15.2 from the active valve device. This commutation forced by the until then passive valve device is to be understood as concurrent commutation.

Further, a cooperative commutation to the until then passive valve device in case of an error detected by means of self-diagnosis can also be effected by the respective active valve device itself, wherein respective monitoring functions with respect to the nominal values, actual values and the control deviations in the until then active valve device are provided in this case as well.

In an advantageous embodiment, the underlaying force regulator of the regulating magnet of the electrohydraulic valve devices comprises a two-position controller. This leads to a temporal oscillation of the force reference signals, and thereby to a permanent application of small setting movements to the mechanical components of the valve, which therefore shows a reduced sliding friction. In turn, the intended oscillation of the force reference signal can respectively be used for monitoring of the regulation frequency or for the self diagnosis of the valve devices, which are arranged in parallel, since a malfunction may be assumed and a cooperative commutation or a concurrent commutation, respectively, is initiated, if the oscillation of the force reference is missing after a predetermined time interval.

Figure 4:
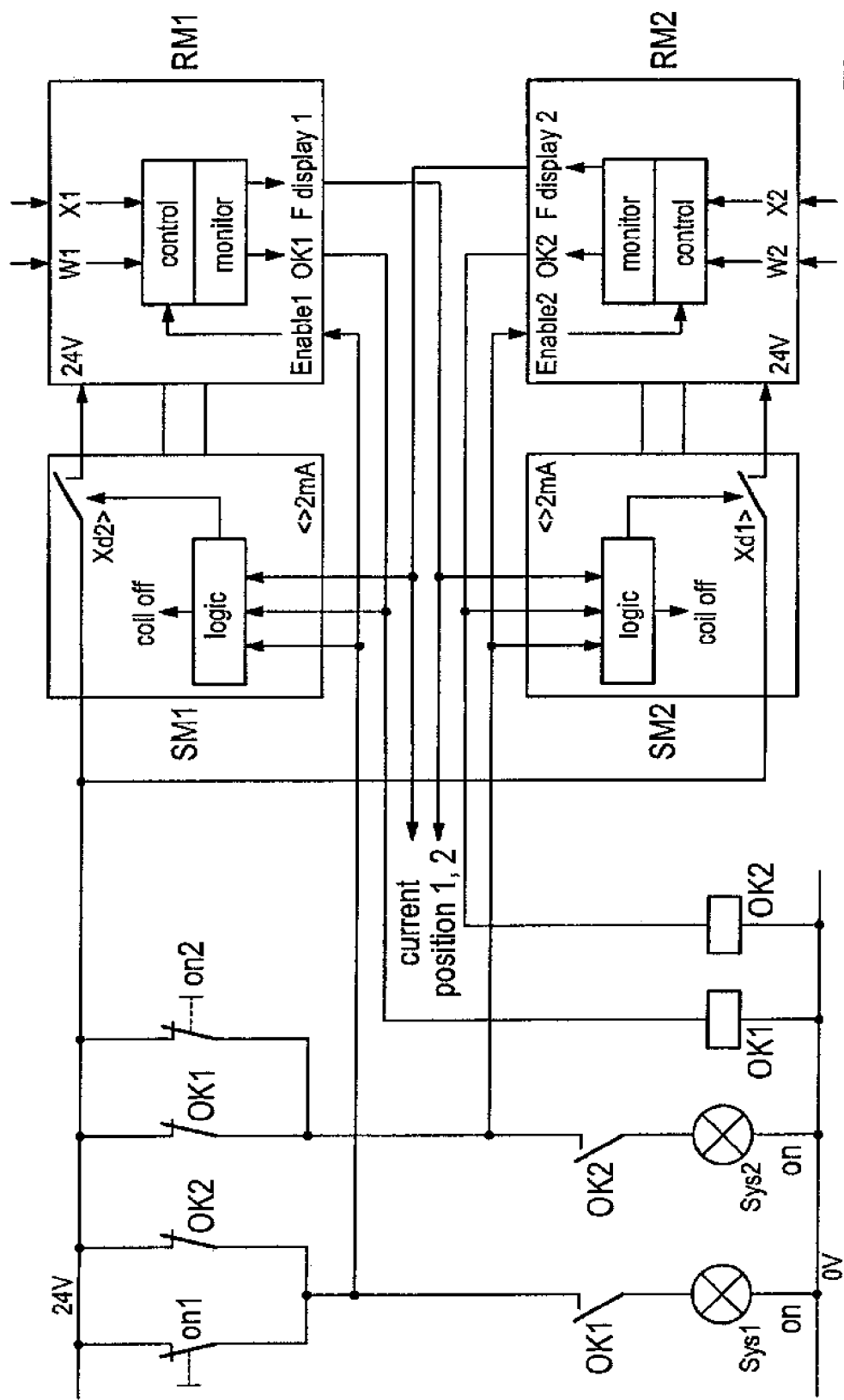
FIG. 4 shows an embodiment of a redundant assembly of magnetic regulation and control installations for the redundant electrohydraulic valve according to the invention, which realizes a concurrent and a cooperating commutation between an active and a passive control system of the redundant electrohydraulic valve.

In FIG. 4, an embodiment for realising the concurrent commutation or the cooperative commutation, respectively, between two electrohydraulic valve devices arranged in parallel is outlined. In particular, the wiring scheme for the control installations of the first and second magnetic component is outlined. It is shown: the control installation SM1 for the first control magnet 17.1 and the control installation RM1 for the first regulating magnet 15.1, as well as the control installation SM2 for the second control magnet 17.2 and the control installation RM2 for the second regulating magnet 15.2. Each control installation is supplied by a voltage supply, which in turn is preferably designed in a redundant manner itself, for example by means of the use of diode modules for combining several electric supply units. In order to realise the cooperative and the concurrent commutation, the signal inputs enable I (enable, 1) and enable 2 (enable, 2), the signal outputs OK1 and OK2, as well as the signal outputs remote monitor 1 (remote monitor 1) and remote monitor 2 (remote monitor 2) are provided for the control installations RM1 and RM2. In this context, it is to be noted that the output signal remote monitor 1 or remote monitor 2, respectively, which is intrinsically provided for the purpose of outputting a function to a control center, provides an output range of 4 mA-20 mA for the normal operation, and by help of the not used signal range below this normal interval a break of cable can be displayed with the signal 0 mA and a different error information can be displayed with the signal 2 mA.

Besides the connection to the control center (actual position 1, 2) the signal output remote monitor 1 of the control installation RM1 for the first regulating magnet is connected to the control installation SM2 of the second control magnet. Accordingly, the output remote monitor 2 of the control installation RM2 of the second regulating magnet is connected to the control installation SM1 of the first control magnet. Via this output signal, a passive valve device can transmit an error signal (=2 mA) to the control installation of the control magnet of the active valve device. Thereby, a concurrent commutation is initiated, which subsequently is described by means of a second valve device being assumed as passive. If the second valve device, which is passive and only monitoring, detects an error condition, it will transmit it to the control installation SM1 of the first control magnet by means of displaying an output signal of 2 mA at the remote monitor 2, This will then separate the regulating magnet 1 from the voltage supply. From this, it follows that the signal output OKI takes on the output value of 0, and that via a correspondingly chosen Interconnection of the control installation RM2 for the second regulating magnet an enabling signal is lead to the enable input 2 thereof. Hereby, the regulating function of the second regulating magnet is activated. In addition, the first control magnet sets the control piston of the first valve device to the hydraulic neutral position, while the second adjusting magnet is not supplied with current, and therefore control movements of the second valve piston for correcting control deviations of the working cylinder 2 can be carried out.

A cooperating commuting of a valve device 1, which is assumed to be active, to the at first passive valve device 2 is effected by means of a deactivating of the at first active OKI signal output by means of RM1. Hereby, the control installation RM2 of the second regulating magnet is lead to an enable signal via the enable line 2 as well, wherein an. activating of the OK2 signal leads to the intended shutdown of the second control magnet, According to a preferable embodiment shown in FIG. 4, a control magnet is only deactivated, if both, the enable signal as well as the OK-signal of the respective valve device are set as active, and at the same time, the remote monitor of the respective other valve device does not take on the error signal of 2 mA.

According to an improvement of the electrohydraulic valve according to the invention, the two valve devices, which are arranged in parallel, are connected to the common inflow channel, the common working channel and the common outflow channel by means of locking valve units. By means of this measure, it is possible to exchange a defective unit after it has been shut-down, or to carry out routine maintenance works, respectively, while the second valve device maintains the position regulation function for the working cylinder. However, if the error case occurs, these locking valve devices do not serve to avoid a hydraulic short circuit. According to the invention, this is effected by means of a control device, which is designed as a unit separated from the regulating device, and the function of which is to move the valve piston into the hydraulic neutral position. From this, it follows that the locking valve devices, which are preferably designed as manually operated locking valves, which are opened during normal operation, do not affect the availability of the device as a whole, and also do not affect the ability of the device as a whole to be shut down.

The electrohydraulic valve according to the invention comprises preferably two valve devices, which are built in the same manner, and which are arranged in parallel, and which act equivalently, wherein only one respective valve device is active though, while the other one fulfills a passive monitoring function. The commuting carried out in case of error can be initiated by the passive as well as by the active valve device. Also, a specific choice of a valve device to be activated is possible from outside, or can be transmitted to the control center for diagnosis purposes, respectively. By means of this measure, a commutation between the individual valve devices is possible without loss of functionality during continuous operation. This possibility of commutation can also be used for test purposes for controlling the currently passive system. A signaling of the active valve device allows the user at any time to detect which of the two systems is actively regulating.

In addition, in an improvement of the electrohydraulic valve assembly according to the invention, the inflow channel P can be designed in a throttled manner. One possibility for realizing this measure is to choose the inflow canal P to have a smaller cross section as compared to the outflow channel T. Alternatively, in the inflow channel P an aperture or a throttle device can be provided. By means of this measure, an improvement of the oil controllability of a valve in case of error is achieved. By means of this preferred direction in operating the working cylinder and a missing equilibration for the direction of movement of the working cylinder resulting therefrom, it is possible to design this preferred direction towards a secure operational state of a process valve moved by the working cylinder. In case of error, preferably that process valve, which is moved by the working cylinder will then be closed, and will not take on a maximally open position in an uncontrolled manner. This preferred direction is especially important in case a hydraulic short circuit should occur irrespective all above described measures for a redundant design of the electrohydraulic valve assembly.

The invention claimed is:

1. An electrohydraulic valve assembly, comprising:
an inflow channel P, a working channel A and an outflow channel T;
a first valve device having a first valve piston, a first control installation, and a first magnetic regulating device for applying a regulated activation force to the first valve piston;
a second valve device having a second valve piston, a second control installation, and a second magnetic regulating device for applying a regulated activation force to the second valve piston;
wherein the first and the second valve devices are arranged in parallel to each other, so that by means of a positioning of the first valve piston and/or the second valve piston a hydraulic connection between the inflow channel P and the working channel A and/or the working channel A and the outflow channel T can be created, or such a connection can be closed;
wherein in operation either the first valve device or the second valve device is active and satisfies the function of the electrohydraulic valve assembly, the respective other valve device being passive;
wherein in case the control installation of the until then active valve device detects an error, it activates the until then passive valve device and deactivates itself;
wherein in case the control installation of the until then passive valve device detects an error, it activates itself and deactivates the until then active valve device;
wherein the deactivating of one of said valve devices comprises a valve piston of the respective valve device moving to a hydraulic neutral position by means of a second stage for each of the first and second valve devices, wherein the second stage comprises an actuating element for moving the valve piston, wherein each said actuating element is separate from the first and second respective magnetic regulating devices.

2. The electrohydraulic valve assembly according to claim 1, wherein the first and/or the second magnetic regulating device comprises a regulating magnet to which a nominal force value for the activation force of the valve piston is predetermined.

3. The electrohydraulic valve assembly according to claim 2, wherein the first valve device and/or the second valve device comprises a control magnet, which moves the valve piston to the hydraulic neutral when activated.

4. The electrohydraulic valve assembly according to claim 2, wherein the electrohydraulic valve assembly regulates the volume stream for at least one corresponding working cylinder, and to the first valve device and/or to the second valve device a position regulating means is assigned, which by means of the regulating of the volume flow regulates the position of the working cylinder.

5. The electrohydraulic valve assembly according to claim 4, wherein the position regulating means comprises an underlaying feedback loop for regulating the activation force of the valve piston.

6. The electrohydraulic valve assembly according to claim 1, wherein a first and/or a second control installation error detecting means are assigned, wherein the error detecting means comprise a nominal value monitoring and/or a monitoring of the speed of change of the nominal value and/or an actual value monitoring with respect to extreme values and/or a two-step control having a regulation frequency monitoring.

7. The electrohydraulic valve assembly according to claim 1, wherein the first valve device and/or the second valve device are designed as proportional directional valve(s).

8. The electrohydraulic valve assembly according to claim 1, wherein the first valve device and/or the second valve device is a 3/3 valve device or a 4/3 valve device.

9. The electrohydraulic valve assembly according to claim 1, wherein the inflow channel P is throttled.

10. The electrohydraulic valve assembly according to claim 9, wherein the inflow channel P has a smaller cross section than the outflow channel T.

11. The electrohydraulic valve assembly according to claim 9, wherein the inflow channel P comprises an aperture.

12. The electrohydraulic valve assembly according to claim 3, wherein the electrohydraulic valve assembly regulates the volume stream for at least one corresponding working cylinder, and to the first valve device and/or to the second valve device a position regulating means is assigned, which by means of the regulating of the volume flow regulates the position of the working cylinder.

13. The electrohydraulic valve assembly according to claim 2, wherein a first and/or a second control installation error detecting means are assigned, wherein the error detecting means comprise a nominal value monitoring and/or a monitoring of the speed of change of the nominal value and/or an actual value monitoring with respect to extreme values and/or a two-step control having a regulation frequency monitoring.

14. The electrohydraulic valve assembly according to claim 3, wherein a first and/or a second control installation error detecting means are assigned, wherein the error detecting means comprise a nominal value monitoring and/or a monitoring of the speed of change of the nominal value and/or an actual value monitoring with respect to extreme values and/or a two-step control having a regulation frequency monitoring.

15. The electrohydraulic valve assembly according to claim 4, wherein a first and/or a second control installation error detecting means are assigned, wherein the error detecting means comprise a nominal value monitoring and/or a monitoring of the speed of change of the nominal value and/or an actual value monitoring with respect to extreme values and/or a two-step control having a regulation frequency monitoring.

16. The electrohydraulic valve assembly according to claim 5, wherein a first and/or a second control installation error detecting means are assigned, wherein the error detecting means comprise a nominal value monitoring and/or a monitoring of the speed of change of the nominal value and/or an actual value monitoring with respect to extreme values and/or a two-step control having a regulation frequency monitoring.

17. The electrohydraulic valve assembly according to claim 2, wherein the first valve device and/or the second valve device are designed as proportional directional valve(s).

18. The electrohydraulic valve assembly according to claim 3, wherein the first valve device and/or the second valve device are designed as proportional directional valve(s).

19. The electrohydraulic valve assembly according to claim 4, wherein the first valve device and/or the second valve device are designed as proportional directional valve(s).

20. The electrohydraulic valve assembly according to claim 5, wherein the first valve device and/or the second valve device are designed as proportional directional valve(s).

21. The electrohydraulic valve assembly of claim 1, wherein the second stage actuating elements comprise control magnets.

* * * * *